United States Patent [19]

Mejia

[11] Patent Number: 4,581,570
[45] Date of Patent: Apr. 8, 1986

[54] MULTIPLE CELL BOOSTER BATTERY SWITCH ASSEMBLY

[75] Inventor: Santiago Mejia, Pompano Beach, Fla.

[73] Assignee: Maria Mercedes Mejia, Pompano Beach, Fla.

[21] Appl. No.: 542,200

[22] Filed: Oct. 14, 1983

[51] Int. Cl.[4] .............................................. H02J 7/00
[52] U.S. Cl. ......................................... 320/2; 320/7; 320/16
[58] Field of Search .................... 320/2, 7, 16; 307/71; 428/100

[56] References Cited

U.S. PATENT DOCUMENTS 2,725,488 11/1955 Hueffed et al. ...................... 320/16
2,761,978 9/1956 Piumi ..................................... 320/16

Primary Examiner—Peter S. Wong
Assistant Examiner—Anita M. Ault
Attorney, Agent, or Firm—Shlesinger Arkwright Garvey & Fado

[57] ABSTRACT

A switch assembly for a multiple power cell unit is readily mounted and has the ability to conveniently provide booster capability to a battery by interconnecting the terminals of the cells from an original standby parallel connection to a series connection when terminal connecting busses and their contact elements are moved from parallel to series connection.

13 Claims, 11 Drawing Figures

MULTIPLE CELL BOOSTER BATTERY SWITCH ASSEMBLY

BACKGROUND OF THE INVENTION

This invention relates to a switch assembly for a multiple cell power battery which will readily permit it to be used for proving aditional power to a battery.

The problem of loss of battery power in cold whether, and the high powered drain under those conditions is well known.

The consequent failure of batteries under these conditions and the inconvenience and problems that are created at the time of such failures have been a long standing problem. One approach to this problem has been to keep an extra battery with jumper cables which can manually be connected to the regular battery as a booster when necessary.

This is not been a satisfactory solution to the problem, where there is a need a convenient economical and fast acting arrangement for suppling the booster power required under these circumstances.

SUMMARY OF THE INVENTION

Accordingly, it is a principal object of this invention to provide a convenient and effective power booster for a battery regularly in use whenever such additional power is required.

Another object of this invention is to provide a convenient switch arrangement for placing additional voltage and power in circuit with the regular battery normally used.

A further object of this invention is to provide a switching assembly for a multiple cell power pack which will permit it to be used conveniently and in place of a auxiliary booster battery.

A further object of this invention is to provide a switching assembly for a booster battery which will permit it to be used in permanent connection with the regular battery, contributing some power during such regular usuage, and supplying additional booster power immediately whenever it is necessary.

A further feature of this invention is to incorporate as part of a booster battery a multiple cell unit and interconnected switch assembly which will permit power to be supplied at both a low normal battery use and at higher severe power and voltage requirements.

It is a still further object of this invention to provide a switching assembly for a multiple power cell unit which will permit it to be readily be used on a stand by basis as a booster power pack.

A still further object of this invention is to provide a switching assembly for a multiple cell battery that will permit it to be permanently incorporated in a regular battery circuit in parallel connection, and to immediately switch when required to series connection for additional power requirements during the time that there is a severe current and power requirement on the battery circuit.

A still further object of this invention is to provide a controlled switch assembly for suppling extra booster voltage only during the time that such voltage is required.

DESCRIPTION OF THE INVENTION

Figure 1:
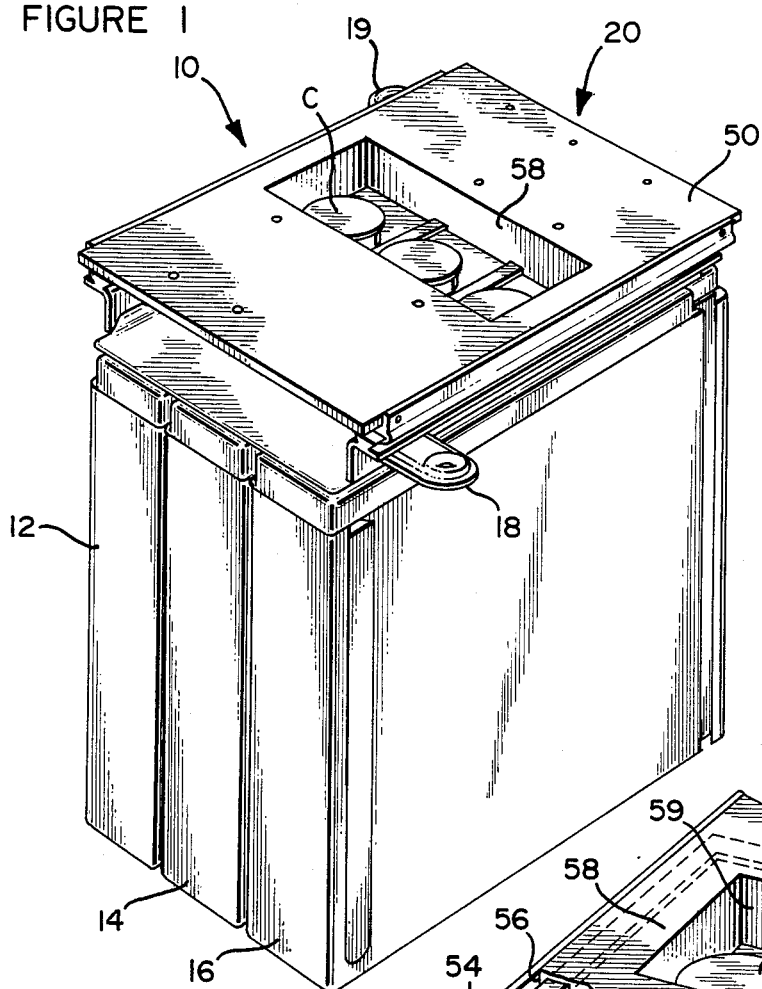
FIG. 1 is a perspective view of the multiple cell booster battery and switch assembly.

Referring to the drawings, FIG. 1 shows a perspective view of a multiple cell battery and control switch assembly generally indicated at 10, in which the individual power battery cells 12, 14 and 16, are connected together and have externally mounting conductor straps 18 and 19 extending outwardly from their terminals.

The switch assembly is generally indicated at 20 and is mounted directly on top of the modular power cell assembly 10. A cutaway perspective view is shown in FIG. 2 of the switch assembly, and will be referred to in connection with FIGS. 3 and 4 which disclose respectably top and sectional views of switch assembly 20.

Figure 2:
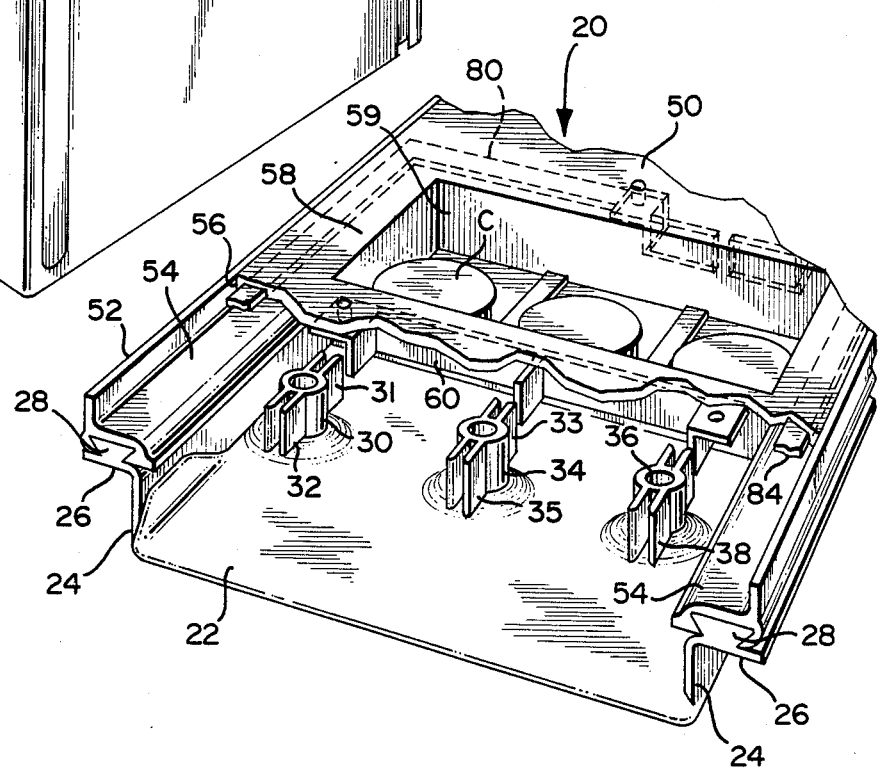
FIG. 2 is a partial cut away perspective view of the switch assembly.

The switch assembly 20 includes a bottom plate 22 shown in FIG. 2 which has upwardly extending longitudinal sides 24 and outwardly extending longitudinal strips 26 on which upwardly extending dovetail connecting strips 28 are integrally molded.

The bottom plate 22 has an upwardly extending terminal connecting element to which parallel outwardly extending and spaced plate connector elements 31 and 32 are connected. The assembly is made of brass preferably for conducting purposes and is mounted securely on the lower plate 22 which is preferably made of moldable plastic and is non-conducting material.

Similarly, the terminal-connector element 34 is directly mounted in alignment with terminal-connector 30 and is positioned to be directly mounted over an end terminal of battery cell 14 in direct alignment. As can be seen from FIG. 3, and FIG. 4 the terminal pieces are shown in dotted outline immediately below the terminal-connectors 30,34 and 36, such that they present the central annular opening area in direct alignment with the axial bore in the top of the terminals.

Figure 3:
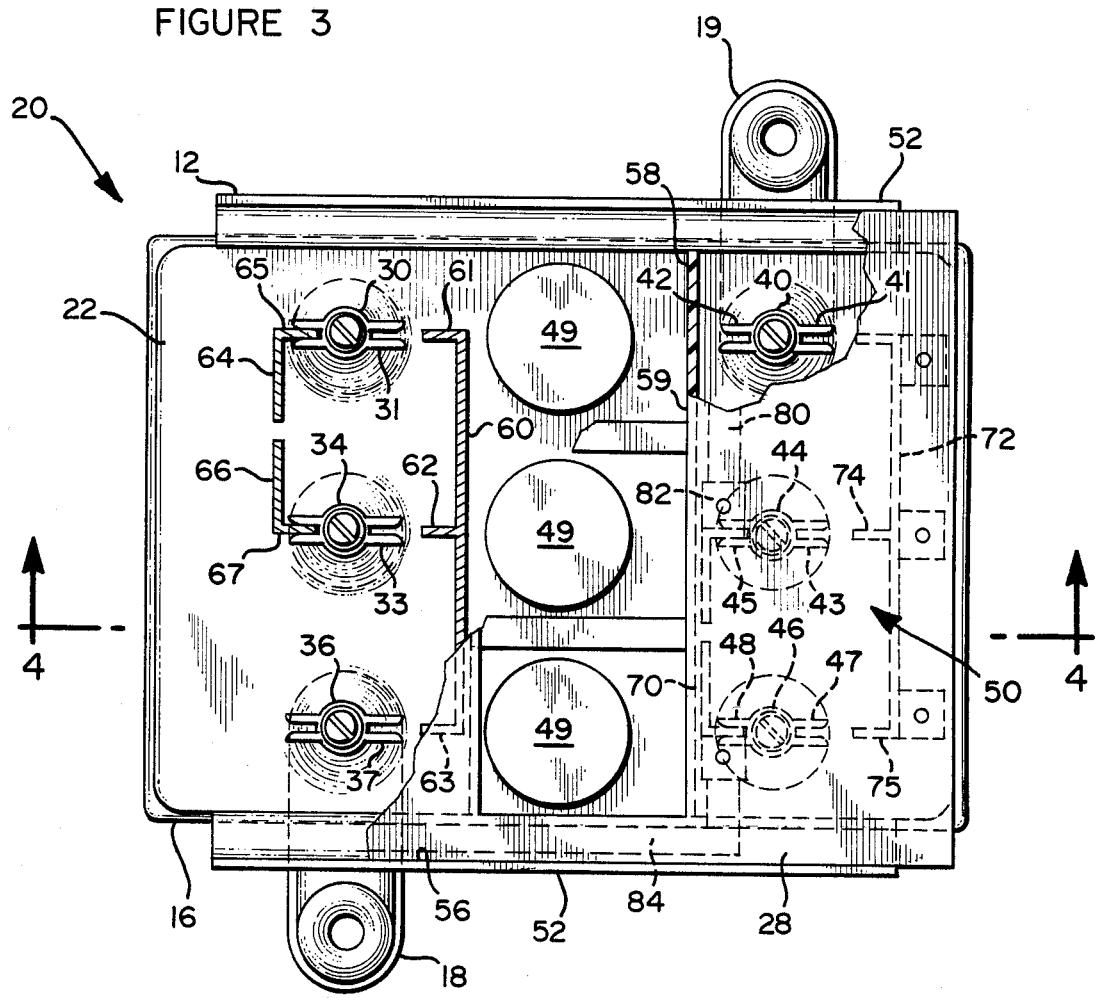
FIG. 3 is a top view of the switch assembly with a portion thereof cut away.
Figure 4:
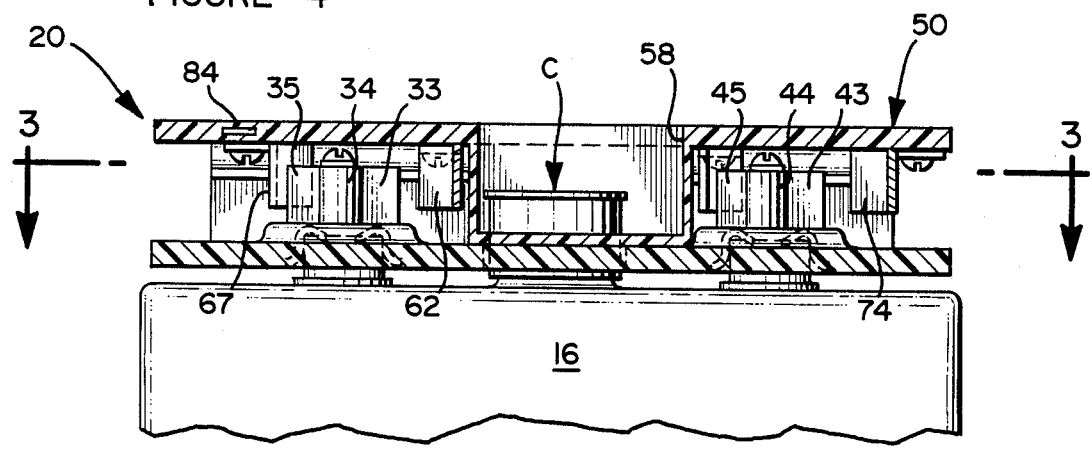
FIG. 4 is a section along Line 4—4 of FIG. 3.

A screw as shown in FIGS. 3 and 4 extends through the central annular section 30,34 and 36 of the terminal-connectors and into the threaded bore of the terminal to hold the bottom plate of the assembly in position and to provide an electrical conductive path from the terminal to the connectors 30, 34 and 36.

A similar terminal connecting arrangement is shown in FIGS. 3 and 4 for the other side of the assembly, in which the connecting elements 40, 44, and 46 are mechanically held in position and an electrical conductive path provided by the retaining screws which extend downwardly through each of the terminal connectors and threadably engage the terminal. It can be seen that with the use of six brass screws, the bottom plate 22 is firmly held in position on top of the composite modular battery, and the upstanding electrical terminal connector assemblies, (30,34,36,40,44, and 46) are each individually connected to the corresponding terminal disposed immediately below them.

The lower plate 22 has three central openings 49 through which access is given to the batteries for checking through their opening the electrolyte level.

The six terminals are connected either in series or parallel by conductor busses and contact elements which are moved into and out of engagement with the terminal connectors.

This is accomplished by the movement of the upper plate 50 which slides with a guide member 52 on which it is mounted. The guide has an inwardly extending recess 54 which is shaped to receive the dovetail 28 of the upstanding portion 26 of the lower plate 22. The side edges of the slide top plate rest on the surface 54 and are in sliding engagement therewith along each of its edges 56 which engage the upward projecting portion of the guide 52. The upper plate has a central recess 58 shown in FIGS. 1 and 2 which gives access to the battery caps.

Attached to the lower surface of the plate 68 are series and parallel bus members which are moved longitudinally with the top plate and their contact elements are moved either into or out of engagement with the parallel contact engagement elements of the terminal connectors.

Referring to FIGS. 2 and 3, it will be seen that the bus or contact bar 60 carries engagement elements 61, 62 and 63. These are moved with the top plate into and out of engagement with the pairs of parallel engaging elements, 31, 33, and 37 respectably. This arrangement will place the terminals associated with the terminal connector 30, 34, and 36 in contact with each other. All of the terminals are of the same polarity, and with the connecting bar 60 may be said to be a parallel circuit connection.

On the other side of the terminal connectors are two individual connector members. One connector member 64 has a conducting plate 65 which engages the parallel contact elements 32. In all of these instances, the contact between the plate and the parallel engaging elements is a firm slightly tapered fit, the plates being somewhat resilient. This provides a large electrical contact area through which the electrical current can pass.

In alignment with this series conductor bar 64 is a second conductor bar 66 which is spaced therefrom and is in contact with the terminal connector 34 through its blade element 67 and the parallel connecting plates 35.

On the other side of the recess 58 is a series connecting bus 68 which has engaging blade 69 this is moved into engagement with the parallel blade engagement elements 45 of the terminal connector 44. Another series connecting bus 70 having a blade element 71 is placed in alignment with the parallel spaced engaging elements 48 of the terminal connector 46.

Figure 5:
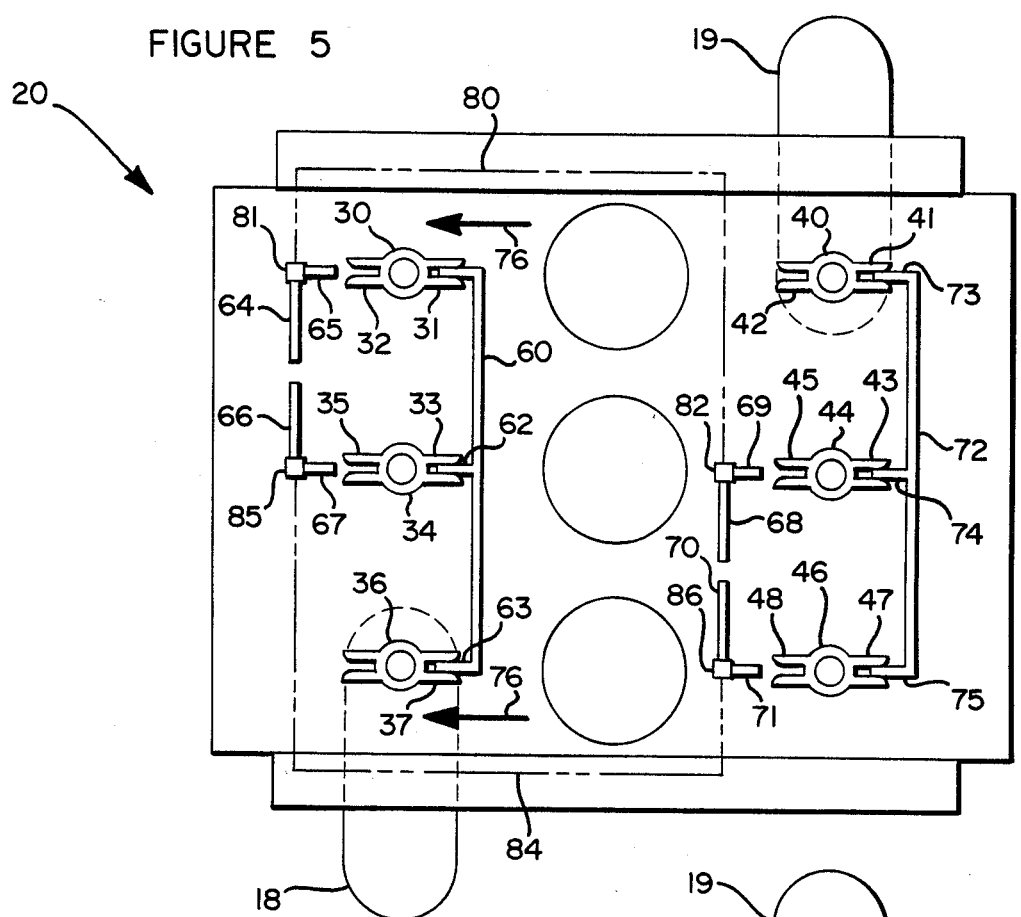
FIG. 5 is a top view of the switch assembly with the top plate removed and showing parallel electrical interconnection between terminals.
Figure 6:
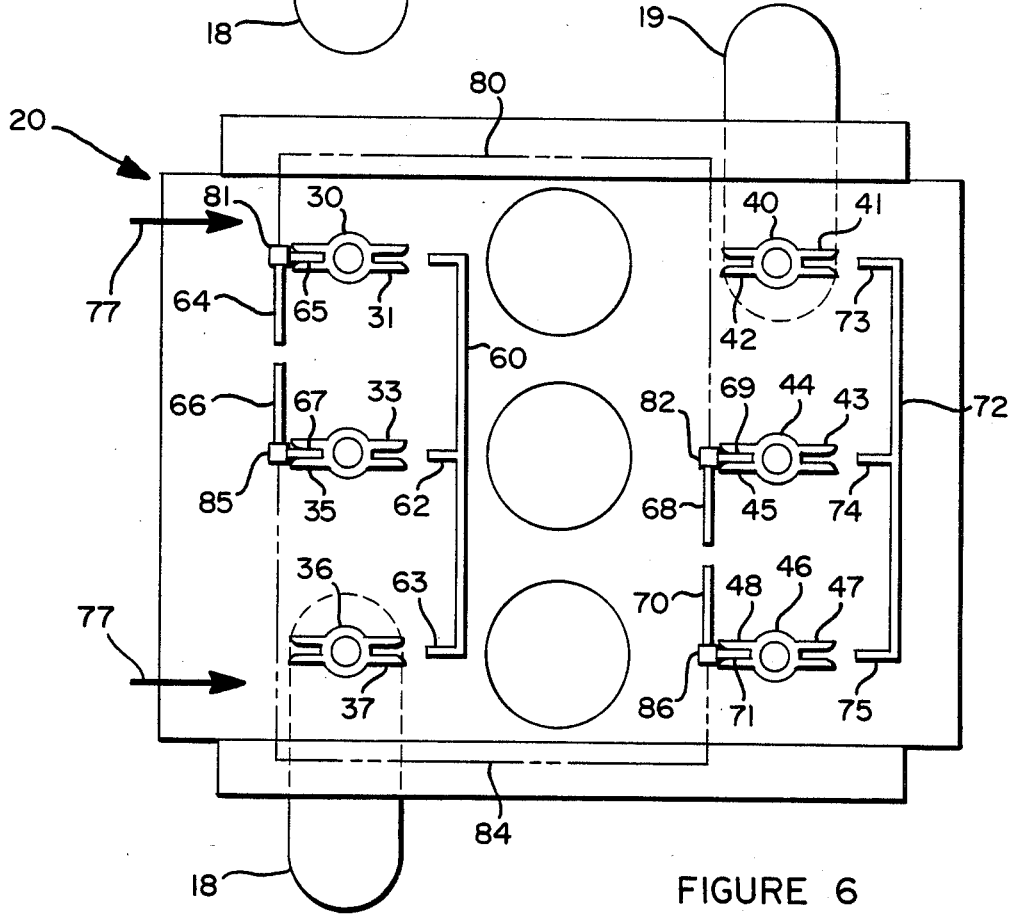
FIG. 6 is a top view of the switch assembly with the top plate removed and showing series interconnection of the battery cell terminals.

FIG. 5 and FIG. 6 illustrate the manner in which the elements are interconnected either in series or in parallel. A portion of the connecting bus 80 and the connecting bus 84 between the series busses are shown in FIG. 2, as well as in dotted of outline in FIG. 3, and in section on the left hand portion of upper plate 50 in FIG. 4.

FIGS. 5 and 6 show the electrical interconnection of the conductor bars 80 and 84, which are embedded in the top plate. Conductor bar 80 connects the series bus 64 with the series bus 68 at contact bus 81 and 82.

The lower series connecting strip 84 connects the series bus 66 with the series bus 70 and extends between points 85 and 86.

FIGS. 5 and 6 illustrate the electrical and connecting arrangement in the two positions of the top plate 50.

Referring to FIG. 5, when the top plate is moved to the left, the parallel connection busses 60 and 72 are moved to the left and their contact plates tie each set of three battery terminals together in a common polarity connection. For example, the parallel bus 60 connects the terminals connectors 30, 34, and 36 together, all terminals being of the same plurality by arrangement of the cells in the modular battery cell itself. Similarly, the parallel connecting bus 72 is moved into electrical engagement with the parallel contact plates of the connecting terminals 40, 44, 46 to connect all of these terminals which are the same plurality and of opposite plurality to the terminals at the other side, together.

When the top plate 50 (not shown), which supports all of the connecting busses is moved to the right as indicated by the arrows 77, the arrow connecting busses 60 and 72 are moved out of engagement with their respective sets of terminal connectors. And then the series bus members 64, 66, and 70 are moved into engagement with their respective terminal connectors. This is shown in FIG. 6, and it will be noted that thate is a direct electrical connection between terminal connector 30 and terminal connector 44 through connecting bus 64, connecting strip 80, and connecting bus 68.

A similar type of electrical connection is made between connector terminals 34 and 46 through connecting strip 84 and contact series connector busses 66 and 70. With this arrangement, current can flow from the conducting strap 18 to terminal 36 and through the first cell terminal 46 which is connected through conductor strip 84 to terminal connector 34. The current flow will then be through the second cell to the opposite terminal and through the connector terminal 44 which then is connected through the connector strip 80 to the upper left terminal 30 of the upper cell, and through which cell current then flows to the opposite terminal and out the conductor strap 19.

Figure 7:
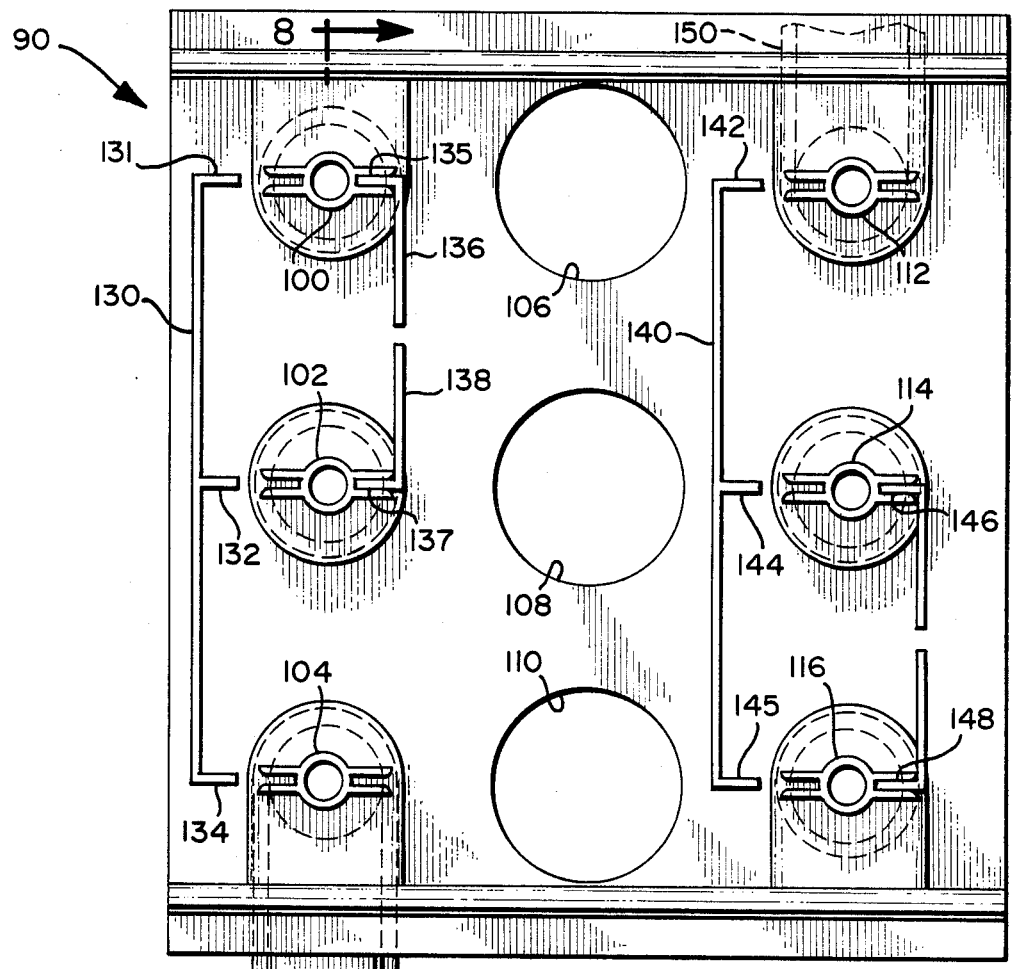
FIG. 7 is a top view of the switch assembly with the top plate removed in which a different side retaining arrangement is used for the top plate.
Figure 8:
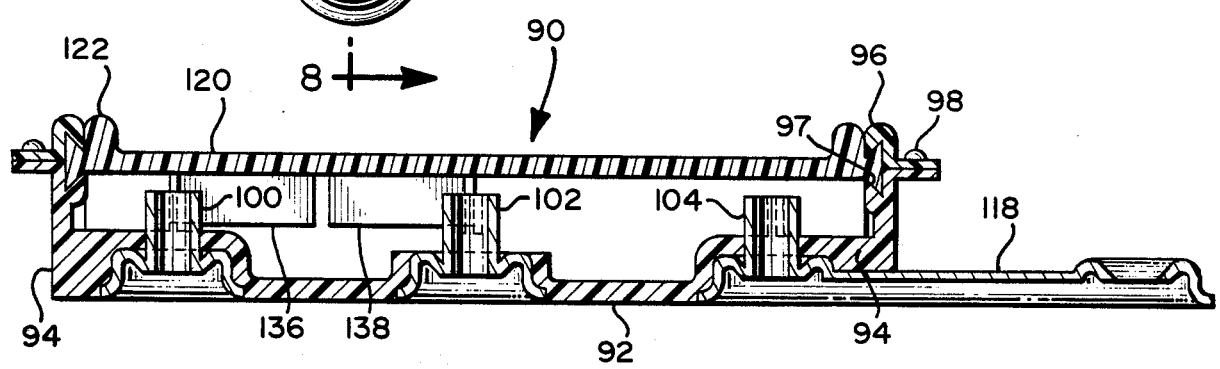
FIG. 8 is a section along Line 8—8 of FIG. 7.

FIGS. 7 and 8 show a modification of the manner in which the edges of the upper plate are supported, as will be seen with respect to reference to FIG. 8 in particular. Assembly generally indicated at 90 has a lower plate 92 and an upstanding end section integrally with 94. The end section 94 has a portion which forms the cavity for reception of a dovetail slide along its entire length.

An upper removable strip 96 has a corresponding indentation 97 which extends along the length and compliments that portion in the upstanding end pieces 94. Both members 94 and 96 are fastened together along a flange extending outwardly from each element by several threaded screws 98.

Referring to FIG. 7 primarily, it can be seen that the arrangement of terminal connectors 100, 102 and 104 on the left side of the battery unit is similar to the previously described embodiments. In this modification, the battery caps are not shown, and the central openings 106, 108 and 110 are indicated in FIG. 7.

On the right side of the assembly, as shown in FIG. 7, the terminal connectors 112, 114, and 116 are shown.

The top plate 120 has along of each of its side edges an upstanding linear section which is immediately adjacent to an end dovetail shaped along the entire periphery of the upper plate 120 and which slidably fits within the recess formed by members 94 and 96.

The connector bus members 130, 136, 138, 140, 146, and 148 act and operate in the same manner as previously described with respect to FIGS. 5 and 6.

Figure 9:
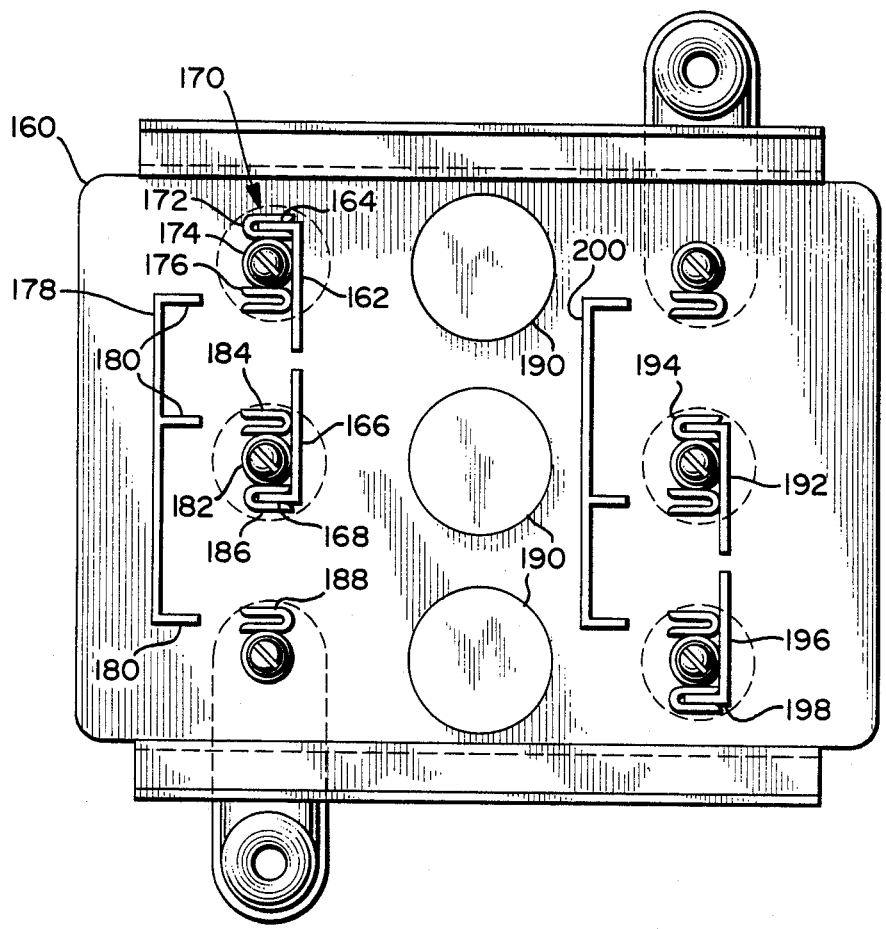
FIG. 9 is a top view of another type of switch plate assembly with the top plate removed and showing a different type of electrical contact.

Aother embodiment is shown in FIG. 9, which provides for more room for movement of the upper plate and for clearance between the battery caps.

In this modification the lower plate 160 carries a series conductor bus 162 with a conducting plate 164, aligned as with previous embodiments with conductor bus 166 which has a conducting blade 168.

The terminal connector 170, which is typical for all six terminal connectors of this modification, has a central cylindrical section 174 which is threadably held in engagement with the terminal below with which it is aligned. It has connected at one side a U-shaped member 172 which can be affixed as by welding. This faces the connector bus 162, as shown and is adapted to engage the blade 164 in tight contact. The U-shaped member 176 faces in the opposite direction and is aligned with the blade 180 of the corresponding parallel connecting bus 178.

Aside from the differences in construction of the connector terminal, the operation and function of the modification is the same as previously described.

The unit is shown in the series position with the conducting busses 162 and 166 in engagement with their respective terminal connectors 174 and 182.

The parallel connecting bus is shown as facing clear of any electrical or physical contact with the terminal connectors.

It will be noted that in this arrangement, the series and parallel conductor busses are show in the opposite arrangement from that of the earlier figure. The operation, however, is the same. When the series conductor busses are in engagement with the connector terminals, there is a series voltage produced, while if the parallel bus is connected to its respective three terminals, there is a parallel connection at the lower battery cell voltage.

Figure 10:
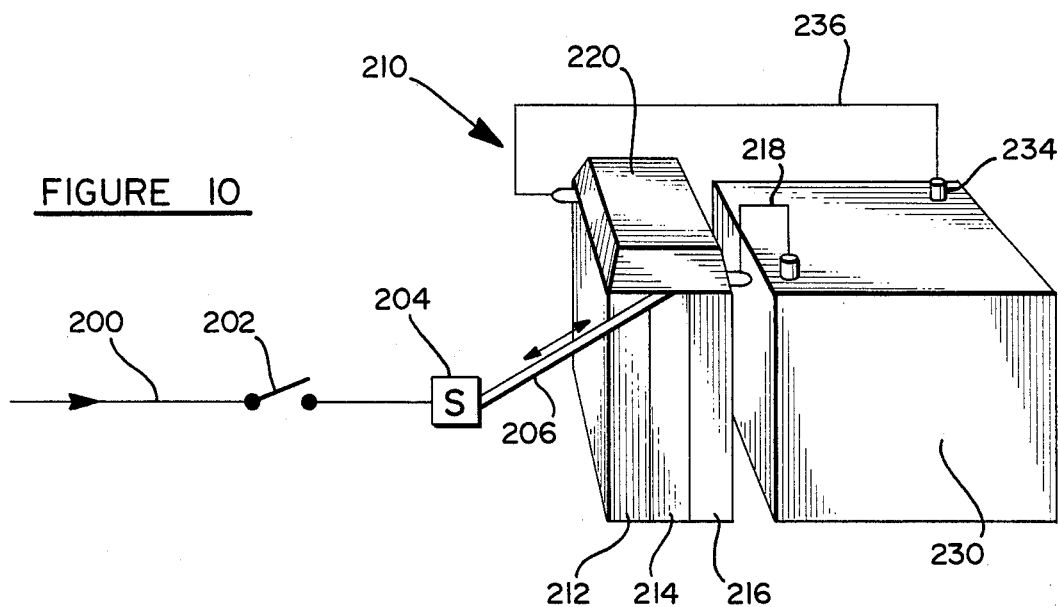
FIG. 10 is a diagrammatic control arrangement for the switch and multiple cell booster.

Referring to FIG. 10, the general arrangement of the components of the system are shown in which supply voltage from the power circuit is supplied along Line 200 and through a switch 202 to a control solenoid 204. Switch 202 is closed when it is desired to activate the switch system to provide increased voltage and power under severe battery loading conditions.

The solenoid mechanically pulls on a cable or rod 206 to control output from the booster power cell and switch assembly generally indicated at 210. Unit 210 corresponds to the unit described with respect to FIG. 1, in which three individual modular power cells 212, 214 and 216, supply usually two volts each are controlled by a switch assembly 220, corresponding to the switch assemblies previously discussed. The power booster is connected by a conductor strap 218 to an ordinary battery 230 through terminal 232. The second battery terminal 234 is connected by Line 236 to the other conductor strap of the power cell booster and switch unit 210.

Figure 11:
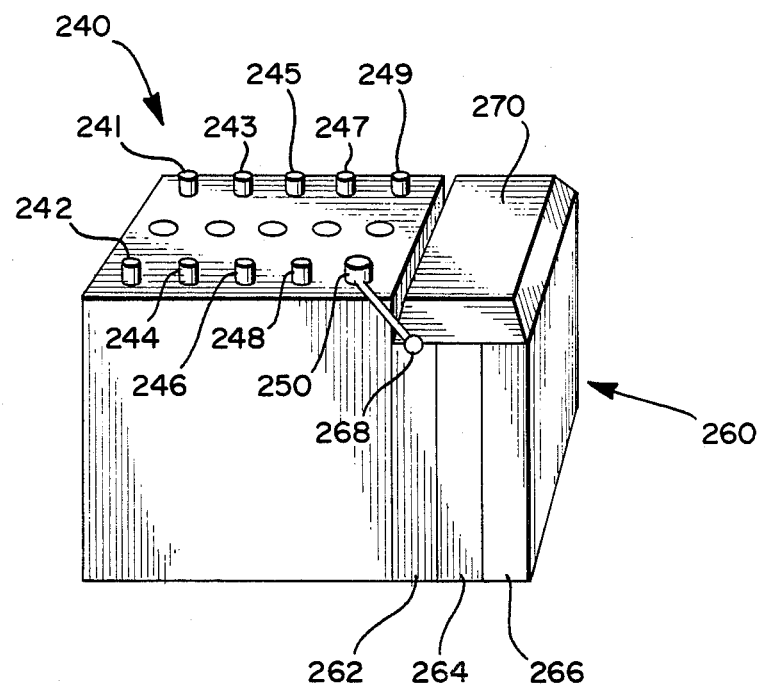
FIG. 11 is a perspective view of an integrally connected multiple terminal battery and booster power cell and switch assembly.

FIG. 11 shows a modification of a compact unitary battery and booster pack/switch assembly, and demonstrates that the entire arrangement can be incorporated in one unitary structure.

The central regular battery unit generally indicated at 240 has either a modular battery construction, or a single case construction with terminals for each cell. This arrangement will permit battery operation even when one cell becomes bad. If there is a modular contruction, the bad cell can be physically removed. In the unitary construction, the power pack can be hooked up in series with those cells that are not defective.

In the regular used battery assembly 240 terminals 241, 243, 245, 247 and 249 can be of the same polarity such as a negative polarity. The opposite polarity terminals are evenly numbered as terminals 242, 244, 246, 248 and 250. The auxiliary power battery assembly 260 consists of three smaller sized auxiliary power cells 262, 264, and 266 are shown as being modular cells, although they could be integrated in one case with individual terminals connecting with the switch assembly 270. Terminal 268 is connected to terminal 250 by a Line 280. The other Line connected to the terminals on the other side is not shown in this figure. If it is desired to eliminate one of the cells that goes bad the cable is moved to one of the other terminals to bypass the terminal of the cell that has gone bad.

It should be noted with respect to the control of the switch assembly as shown in FIG. 10 that other devices other than a solenoid may be used. The solenoide 204 can be either be a double acting solenoid or a single acting solenoid with a spring to return the rod 206 to the orignal position after the solenoid has been deactivated by opening of the switch 202.

As can be seen, the switch assembly provides the ability for a battery that normally produces 12 volts, but has been drained due to cold weather or plate deterioration and has fallen to six or eight volts, to be returned to a full 12 volt or more capability by switching in the additional six volts that would be available from a three cell unit rated at two volts.

It should be noted that the booster power pack where high voltage is to be supplied is used only at the time that the high voltage drain is necessary. Otherwise, there is a possibility of damaging other electrical equipment when the higher than 12 volt battery combination is used.

As soon as the engine is cranked and the engine running, the battery power booster can be disconnected.

With respect to the switch unit, it should be noted that equivalents which assemblies could be used that could be either vertically moveable rather than moveable horizontally, It is also possible to use a rotational relative movement, if desired.

With respect to the general application and use of this power pack booster and switch assembly, one of the main usages for this unit is for cold weather starting. However, it should be noted that the advantages to that flow from the use of the booster is the eliminating of an overload on the battery, thereby extending the life of the regular battery.

A booster power pack can be composed of one or more cells depending upon requirements, with the switch assembly arranged to provide addition to the normal battery circuit in either series or parallel connection.

It should also be noted that with respect to this arrangement every cell is fully charged. This provides an advantage in that the life of the battery is extended, since when a cell loses its charge its life will be shortened.

The additional advantage is that the battery life of the regular battery is extended because the booster battery is supplying power and is connected in circuit with the regular battery at all times.

It should also be noted that only sufficient voltage (6 volts) to compensate for expected voltage loss in the regular battery is required, so that excessive voltage is not applied to the electrical circuit.

I claim:

1. A switch assembly for a multiple power cell battery unit, which have positive and negative terminals on each cell, comprising:
   (a) a base connected to the battery unit and including a terminal connector for each battery terminal which is physically and electrically connected therewith,
   (b) a top plate which is relatively movable with respect to the base and on which a plurality of conducting bus members which have contact elements are mounted,
   (c) the termminal connectors having electrical contacts for engaging the contact element of the conducting bus member,
   (d) each contact element member being positioned with respect to and adapted to engage with the electrical contacts of one of the terminal connectors when the top plate is in one position, and to be disengaged therefrom when the top plate is in a second position,
   (e) each conducting bus member being electrically interconnected with at least one other conducting bus member so that when their respective contact elements are in engagement with the electrical contact members of the terminal connector with which it is associated, the two battery cell terminals are electrically interconnected with each other.

2. The switch assembly for a multiple power cell battery unit as set forth in claim 1, wherein:
   (a) the contact element of the conducting bus member has a single blade which extends toward and is aligned with the terminal connector, and
   (b) the electrical terminal contacts are two parallel spaced plates facing and in alignment with the blade and spaced from each other so as to engage simultaneously in firm physical and electrical contact each side surface of the blade when these elements are moved into engagement.

3. The switch assembly for the multiple power cell unit as set forth in claim 1, wherein:
   (a) the conducting bus members are aligned with respect to the terminal connectors of the positive and negative terminals of the individual battery cells such that in one position of the top plate the individual battery cells are connected is series, and in the other position the battery cells are connected in parallel.

4. The switch assembly for a multiple power cell battery unit as set forth in claim 1, wherein:
   (a) each individual battery cell has an access opening to permit filling of the battery and the determination of the state of the electrolyete which is covered by a battery cap, and
   (b) the base and the top plate are positioned and configured such that their mounting on the battery cells and movement with respect to each other will not interfere with and preclude access to the battery cap.

5. The switch assembly for the multiple power cell battery unit as set forth in claim 1, wherein:
   (a) the individual cells of the battery unit are arranged such that the terminals of similar polarity are in alignment at one end of the battery unit, and
   (b) the conducting bus member for the terminal connectors of common polarity is a single common conductor bus which has a plurality of contact elements which engage corresponding electrical contacts of the terminal connectors.

6. The switch assembly for a multiple power cell battery unit, as set forth in claim 5, wherein:
   (a) the contact element of the conducting bus member has a singlee blade which extends toward and is aligned with the terminal connector, and
   (b) the electrical terminal contacts are two parallel spaced plates facing and in alignment with the blade and spaced from each other so as to engage simultaneously in firm physical and electrical contact each side surface of the blade when these elements are moved into engagement.

7. The switch assembly for the multiple power cell battery unit as set forth in claim 5, wherein:
   (a) a single series conductor bus for the terminal connectors is disposed on the opposite side thereof from the parallel conductor bus and in spaced relation therefrom such that when the top plate is moved in one direction the parallel conductor busses are brought into engagement with the terminal connectors, and when the top plate is moved in the opposite direction the parallel conductor busses are disengaged, and the series conductor busses are brought into engagement with the terminal conductors.

8. The switch assembly for the multiple power cell unit as set forth in claim 1, wherein:
   (a) the base member and the top plate are held together in interengaging sliding contact along their longitudinal side edges.

9. The switch assembly for the multiple power cell unit as set forth in claim 8, wherein:
   (a) the base and top plate are held together along their longitudinal edges by an interfitted dovetail configuration extending the length thereof.

10. The switch assembly for the multiple power cell unit as set forth in claim 8, wherein:
    (a) one of the interfitting and relatively slidable members is removably fastened in position.

11. The switch assembly for the multiple power cell battery unit as set forth in claim 1, wherein:
    (a) the terminal connector has a cylindrical central section which is in alignment with the battery terminal and a longitudinal threaded bore therein, and
    (b) retaining screws extend downward through the cylindrical central section of the terminal connector into threaded engagement with the bore of the terminal to hold the base member in firm engagement and good electrical contact therewith.

12. A power booster switch circuit, comprising:
    (a) a booster battery pack having an externally controlled switch unit for moving the output voltage from a lower to a higher voltage,
    (b) a battery for supplying normal power requirements to which the booster power pack is connected, (c) control means conected to the switch unit for moving the switch from a lower to a higher voltage output setting, and (d) the regular battery and the booster battery pack are one unitary structure.

13. The power booster switch circuit as set forth in claim 12, wherein:
 (a) the control means includes a solenoid mechanically connected to the switch unit, and
 (b) an electrical control circuit including a switch connected to the solenoid for controlling operation thereof.

* * * * *